(12) United States Patent
Kobayashi

(10) Patent No.: US 11,558,602 B2
(45) Date of Patent: Jan. 17, 2023

(54) HEAD-MOUNTED DISPLAY

(71) Applicant: SONY CORPORATION, Tokyo (JP)

(72) Inventor: Toshimi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 17/250,250

(22) PCT Filed: May 9, 2019

(86) PCT No.: PCT/JP2019/018583
§ 371 (c)(1),
(2) Date: Dec. 21, 2020

(87) PCT Pub. No.: WO2020/003756
PCT Pub. Date: Jan. 2, 2020

(65) Prior Publication Data
US 2021/0274154 A1  Sep. 2, 2021

(30) Foreign Application Priority Data

Jun. 29, 2018  (JP) .............................. JP2018-124056

(51) Int. Cl.
*G09G 5/00* (2006.01)
*H04N 13/344* (2018.01)
(Continued)

(52) U.S. Cl.
CPC ....... *H04N 13/344* (2018.05); *G02B 27/0172* (2013.01); *G02C 1/10* (2013.01);
(Continued)

(58) Field of Classification Search
CPC .............. G02B 27/017; G02B 27/0172; G02B 27/0176; G02B 2027/0178; G02C 1/10;
(Continued)

(56) References Cited

U.S. PATENT DOCUMENTS 8,570,244 B2 * 10/2013  Mukawa .............. G02B 6/0018
                                                              345/207
9,075,249 B2 *  7/2015  Heinrich ................ G02C 11/10
(Continued)

FOREIGN PATENT DOCUMENTS

CN    101750738 A   6/2010
JP    2010-145859 A 7/2010
(Continued)

OTHER PUBLICATIONS

International Search Report and Written Opinion of PCT Application No. PCT/JP2019/018583, dated Jul. 30, 2019, 10 pages of ISRWO.

*Primary Examiner* — Joe H Cheng
(74) *Attorney, Agent, or Firm* — Chip Law Group

(57) ABSTRACT

There is provided a head-mounted display comprising an image generator that generates an image, a pair of optical plates to be arranged in front of both eyes of an observer who observes the image, the pair of optical plates causing the image to be displayed, a first frame that holds the pair of optical plates, and a second frame including a to-be-fixed part, in which a fixing part to which the to-be-fixed part is fixed is provided at the central part of the first frame in the horizontal direction.

19 Claims, 6 Drawing Sheets

(51) Int. Cl.
  *G02B 27/01* (2006.01)
  *G02C 1/00* (2006.01)
  *G02C 11/00* (2006.01)

(52) U.S. Cl.
  CPC ...... *G02C 11/10* (2013.01); *G02B 2027/0178* (2013.01); *H04N 2213/008* (2013.01)

(58) Field of Classification Search
  CPC .. G02C 5/126; G02C 2200/08; H04N 13/344; H04N 2213/008
  See application file for complete search history.

(56) References Cited

U.S. PATENT DOCUMENTS

| | | | | |
|---|---|---|---|---|
| 9,454,011 | B2* | 9/2016 | Hiraide | G02B 27/0172 |
| 10,514,542 | B2* | 12/2019 | Erinjippurath | G06T 11/00 |
| 10,778,826 | B1* | 9/2020 | Wang | G06F 3/167 |
| 11,054,571 | B2* | 7/2021 | Kobayashi | G02B 6/0015 |
| 2004/0113867 | A1* | 6/2004 | Tomine | G02B 27/0176 345/8 |
| 2006/0268220 | A1* | 11/2006 | Hogan | G02B 7/002 351/47 |
| 2009/0180194 | A1 | 7/2009 | Hiroshi et al. | |
| 2010/0157433 | A1 | 6/2010 | Mukawa et al. | |
| 2014/0232619 | A1* | 8/2014 | Hiraide | G02B 27/0176 345/8 |
| 2014/0268336 | A1* | 9/2014 | Hiraide | G02B 27/0172 359/507 |
| 2014/0327602 | A1* | 11/2014 | Hiraide | G02B 27/0172 345/8 |
| 2015/0268475 | A1* | 9/2015 | Lee | G02B 27/0176 345/8 |
| 2016/0011420 | A1* | 1/2016 | Jang | G02B 27/0172 345/8 |
| 2017/0097509 | A1* | 4/2017 | Yoshida | G02B 27/0172 |
| 2017/0176751 | A1* | 6/2017 | Ouderkirk | G02C 7/086 |

FOREIGN PATENT DOCUMENTS

| | | |
|---|---|---|
| JP | 5678460 B2 | 3/2015 |
| JP | 2016-180939 A | 10/2016 |
| WO | 2007/037089 A1 | 4/2007 |

\* cited by examiner

HEAD-MOUNTED DISPLAY

CROSS REFERENCE TO RELATED APPLICATIONS

This application is a U.S. National Phase of International Patent Application No. PCT/JP2019/018583 filed on May 9, 2019, which claims priority benefit of Japanese Patent Application No. JP 2018-124056 filed in the Japan Patent Office on Jun. 29, 2018. Each of the above-referenced applications is hereby incorporated herein by reference in its entirety.

TECHNICAL FIELD

The present technology relates to a technical field of a head-mounted display to be used while being worn on a head of a user who is an observer who observes an image.

BACKGROUND ART

Some head-mounted displays are equipped with two optical modules, and display images in front of user's right and left eyes. Each of the optical modules includes an image generator that generates an image and an optical plate that causes the image to be displayed, which is, for example, a light guide plate. The right and left optical plates are arranged to form a predetermined convergence angle so that the user can visually recognize the images displayed in front of the right and left eyes without feeling uncomfortable.

Furthermore, some binocular head-mounted displays include a spectacle-shaped frame to be worn on the user's head, and an optical module is attached to the frame. The spectacle-shaped frame includes a front part to be positioned in front of the user's head, and a pair of temples to be worn on the user's ears.

In a head-mounted display including such a spectacle-shaped frame, there has been a possibility that the temples extend to the right and left when the user wears the frame so that the front part is distorted and the optical plate attached to the front part is deformed, thereby changing the convergence angle. When the convergence angle changes due to the deformation of the optical plate, images displayed on the right and left may become inconsistent with each other, which may hinder the visual recognition by the user.

In view of the above, in a head-mounted display disclosed in Patent Document 1, an optical plate is attached to the central part of a front part in the horizontal direction, whereby, even in a case where temples extend to the right and left and the front part is distorted, deformation is less likely to be transmitted to the optical plate.

CITATION LIST

Patent Document

Patent Document 1: Japanese Patent No. 5678460

SUMMARY OF THE INVENTION

Problems to be Solved by the Invention

In the head-mounted display disclosed in Patent Document 1 described above, the optical plate and a frame holding the optical plate are positioned in a state of being exposed in front of the head when the display is worn on the head, whereby an external force is likely to be applied to the optical plate and the frame from the front and the convergence angle may change due to the external force from the front. Furthermore, it is also necessary to secure sufficient strength against the external force in the head-mounted display.

In view of the above, it is an object of the present technology to maintain a predetermined convergence angle and to improve strength.

Solutions to Problems

A head-mounted display according to the present technology includes an image generator that generates an image, a pair of optical plates to be arranged in front of both eyes of an observer who observes the image, a first frame that holds the pair of optical plates, and a second frame including a to-be-fixed part, in which a fixing part to which the to-be-fixed part is fixed is provided at the central part of the first frame in the horizontal direction.

With this arrangement, the pair of optical plates are held by the first frame in a predetermined orientation, and the second frame is fixed to the central part of the first frame in the horizontal direction, whereby, even in a case where an external pressure is applied to the second frame, the first frame is less likely to be distorted in the horizontal direction.

In the head-mounted display according to the present technology described above, it is preferable that the second frame is fixed to the first frame in a state of having a gap between the second frame and the first frame at a portion other than the to-be-fixed part.

With this arrangement, even in a case where an external pressure is applied to the second frame, the impact is less likely to be transmitted to the first frame, whereby the first frame is less likely to be deformed.

In the head-mounted display according to the present technology described above, the to-be-fixed part is preferably positioned at the central part of the second frame in the horizontal direction.

With this arrangement, the second frame is fixed to the fixing part of the first frame at the central part in the horizontal direction, and the weight of the second frame is distributed substantially evenly in the horizontal direction.

In the head-mounted display according to the present technology described above, the first frame is preferably formed in a symmetrical shape.

With this arrangement, the weight balance of the first frame in the horizontal direction is made uniform.

In the head-mounted display according to the present technology described above, the second frame is preferably formed in a symmetrical shape.

With this arrangement, the weight balance of the second frame in the horizontal direction is made uniform.

In the head-mounted display according to the present technology described above, it is preferable that two image generators mentioned above are provided, and protective cases are attached to both ends of the second frame in the horizontal direction to cover the two image generators, respectively.

With this arrangement, the image generators are protected by the protective cases.

In the head-mounted display according to the present technology described above, it is preferable that two image generators mentioned above are provided, two protective cases are provided to cover the two image generators, respectively, and the second frame and at least a part of the protective cases are integrally formed.

With this arrangement, the image generators are protected by the protective cases formed integrally with the second frame.

In the head-mounted display according to the present technology described above, a gap is preferably formed between the protective case and the image generator.

With this arrangement, even in a case where an external pressure is applied to the protective case, the impact is less likely to be transmitted to the image generator.

In the head-mounted display according to the present technology described above, the second frame preferably covers the entire first frame.

With this arrangement, the entire first frame is protected.

In the head-mounted display according to the present technology described above, it is preferable that the first frame is provided with a pair of extending parts that hold the pair of optical plates, and the pair of extending parts protrude from at least one end of the fixing part in the vertical direction toward the opposite side in the horizontal direction.

With this arrangement, the optical plates are held on both sides of the fixing part in the horizontal direction.

In the head-mounted display according to the present technology described above, it is preferable that the second frame is provided with a pair of protrusions protruding from at least one end of the to-be-fixed part in the vertical direction toward the opposite side in the horizontal direction, each of the protrusions includes a tabular wall facing in the front-back direction and an overhang overhanging rearward from one end of the wall in the vertical direction, and the wall and the overhang cover the extending part.

With this arrangement, the extending part of the first frame is covered and protected by the wall and the overhang.

In the head-mounted display according to the present technology described above, it is preferable that the to-be-fixed part includes a tabular flat plate facing in the front-back direction and a posterior protrusion protruding rearward from at least one end of the flat plate in the vertical direction, and the to-be-fixed part is fixed in a state where the flat plate is in surface contact with the fixing part.

With this arrangement, the tabular plane is fixed to the fixing part in a state of surface contact.

In the head-mounted display according to the present technology described above, it is preferable that a plurality of fastening parts is provided in a state of being spaced apart from each other in the vertical direction at the central part of the fixing part in the horizontal direction, and the to-be-fixed part is provided with to-be-fastened parts to be fastened to the plurality of fastening parts, respectively.

With this arrangement, in a case where an external pressure is applied to the second frame, the external pressure is transmitted to the central part of the first frame in the horizontal direction.

In the head-mounted display according to the present technology described above, it is preferable that the fixing part is provided with a plurality of fastening parts in a state of being spaced apart from each other in the horizontal direction, and the to-be-fixed part is provided with to-be-fastened parts to be fastened to the plurality of fastening parts, respectively.

With this arrangement, the to-be-fixed part is fastened to the fixing part at a plurality of points in the horizontal direction.

In the head-mounted display according to the present technology described above, the image generator is preferably attached to the optical plate.

With this arrangement, the light that generates the image generated by the image generator is reliably incident on the optical plate.

In the head-mounted display according to the present technology described above, the image generator is preferably attached to the first frame.

With this arrangement, the image generator is held by the first frame together with the optical plate.

In the head-mounted display according to the present technology described above, the first frame and the second frame preferably include different materials.

With this arrangement, the first frame and the second frame include materials suitable for the respective functions.

In the head-mounted display according to the present technology described above, the first frame preferably includes a material having rigidity higher than rigidity of a material included in the second frame.

With this arrangement, the optical plate is held by the first frame including a material having rigidity higher than rigidity of a material included in the second frame.

In the head-mounted display according to the present technology described above, the first frame preferably includes a metal material, and the second frame preferably includes a resin material.

With this arrangement, the first frame includes a metal material that can be subject to high-precision machining, and the second frame includes a resin material having appropriate strength.

In the head-mounted display according to the present technology described above, it is preferable that a pair of temples to be worn on both ears of the observer are provided, and the pair of temples are attached to a pair of the protective cases, respectively.

With this arrangement, the temples are not attached to the first frame, and the first frame is less likely to be distorted in the horizontal direction even in a case where the temples extend in the horizontal direction at the time of wearing.

Effects of the Invention

According to the present technology, the pair of optical plates are held by the first frame in a predetermined orientation, and the second frame is fixed to the central part of the first frame in the horizontal direction, whereby, even in a case where an external pressure is applied to the second frame, the first frame is less likely to be distorted in the horizontal direction, a predetermined convergence angle can be maintained, and the strength can be improved.

Note that the effects described herein are not necessarily limited, and may be any of the effects described in the present disclosure.

MODE FOR CARRYING OUT THE INVENTION

Hereinafter, an embodiment of a head-mounted display according to the present technology will be described with reference to the accompanying drawings.

In the following descriptions, directions of front-back, up-down, and left-right will be indicated with the direction in which a user, who is an observer observing an image while wearing the head-mounted display, visually identifies the image as the front. Furthermore, directions indicated as a front-back direction, a vertical direction, and a horizontal direction include a substantially front-back direction, a substantially vertical direction, and a substantially horizontal direction, respectively.

<Configuration of Head-Mounted Display>

Figure 1:
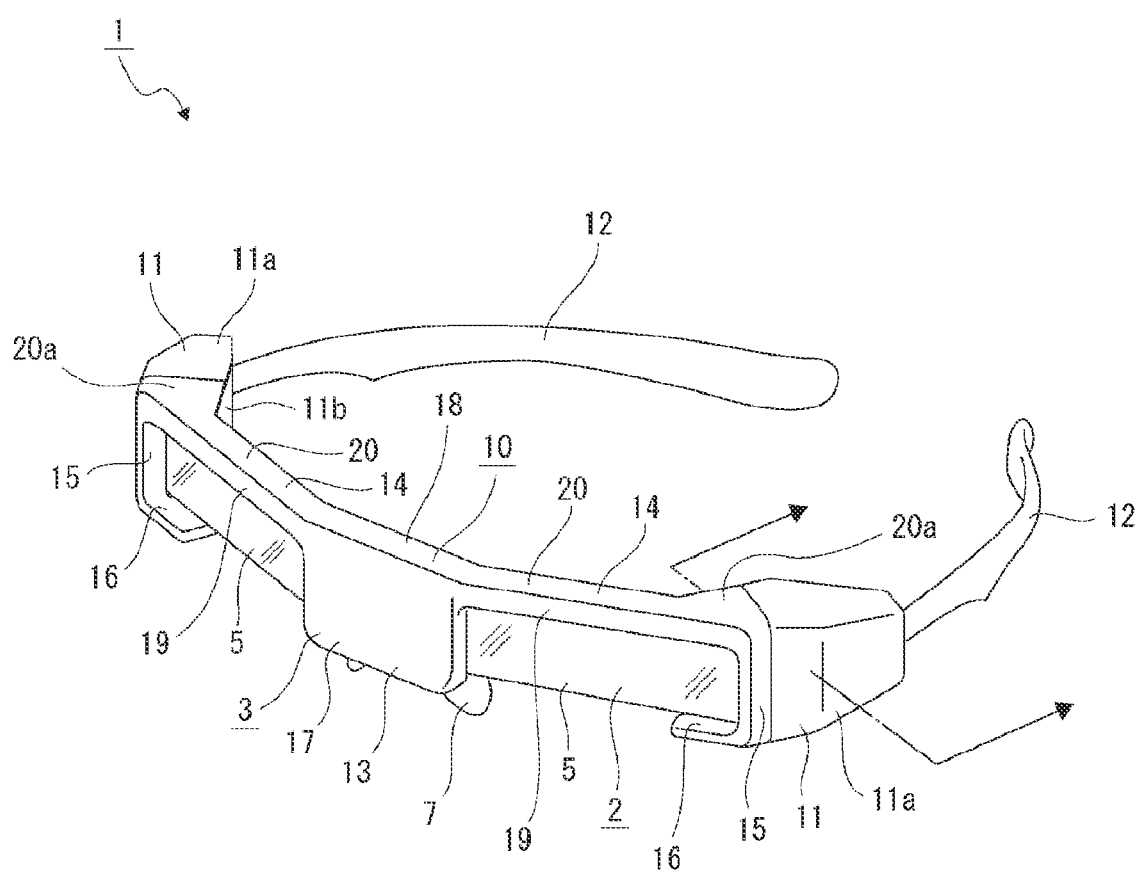
FIG. 1 illustrates an embodiment of a head-mounted display according to the present technology together with FIGS. 2 to 8, and the present drawing is a perspective view of the head-mounted display.
Figure 2:
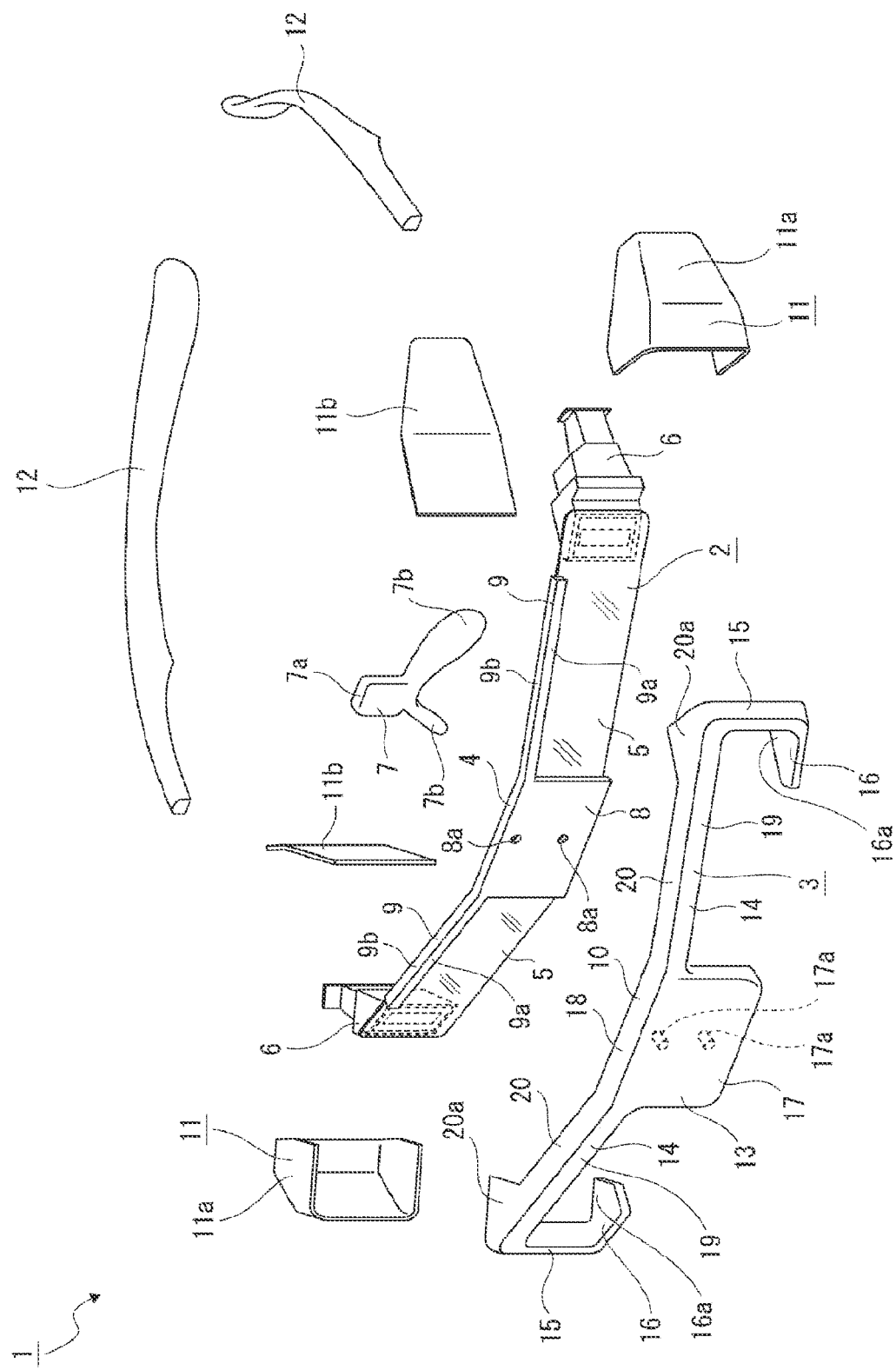
FIG. 2 is an exploded perspective view of the head-mounted display.

A head-mounted display 1 includes an image display unit 2 that displays an image in front of the user's eyes (both eyes), and an exterior unit 3 that holds the image display unit 2 (see FIGS. 1 and 2).

The image display unit 2 includes a first frame 4 to be arranged in front of the user's head, a pair of optical plates 5 and 5 held by the first frame 4, a pair of image generators 6 and 6 attached to the optical plates 5 and 5, and a pad 7 to be in contact with the user's face.

The first frame 4 includes, for example, a metal material in a symmetrical shape (see FIG. 2).

The first frame 4 includes a fixing part 8 positioned at the central part in the horizontal direction, and a pair of extending parts 9 and 9 protruding from the upper end of the fixing part 8 toward the opposite sides in the horizontal direction, respectively. Note that the central part of the first frame 4 in the horizontal direction is not limited to the center in the horizontal direction, and may be a substantially central part near the center.

The fixing part 8 is formed in a tabular shape facing in the front-back direction. A plurality of, for example, two fastening parts 8a and 8a are provided in a manner of being spaced apart from each other in the vertical direction at the central part of the fixing part 8 in the horizontal direction. The fastening parts 8a and 8a are formed as holes, for example.

Figure 3:
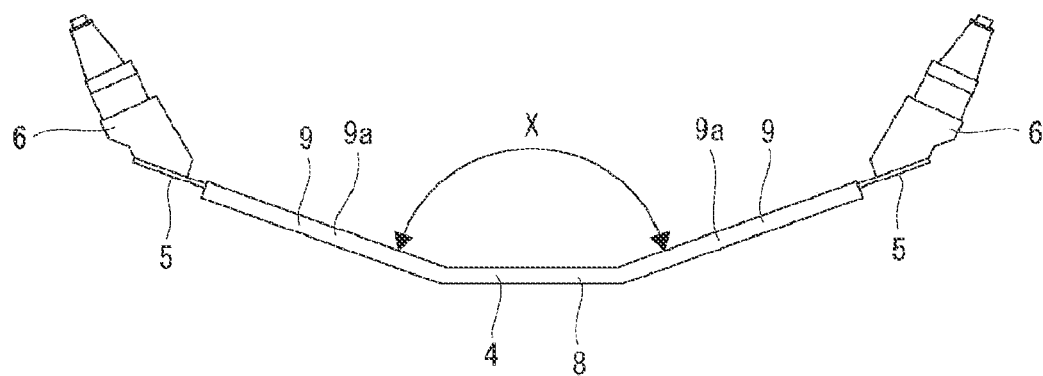
FIG. 3 is a plan view of a first frame.
Figure 4:
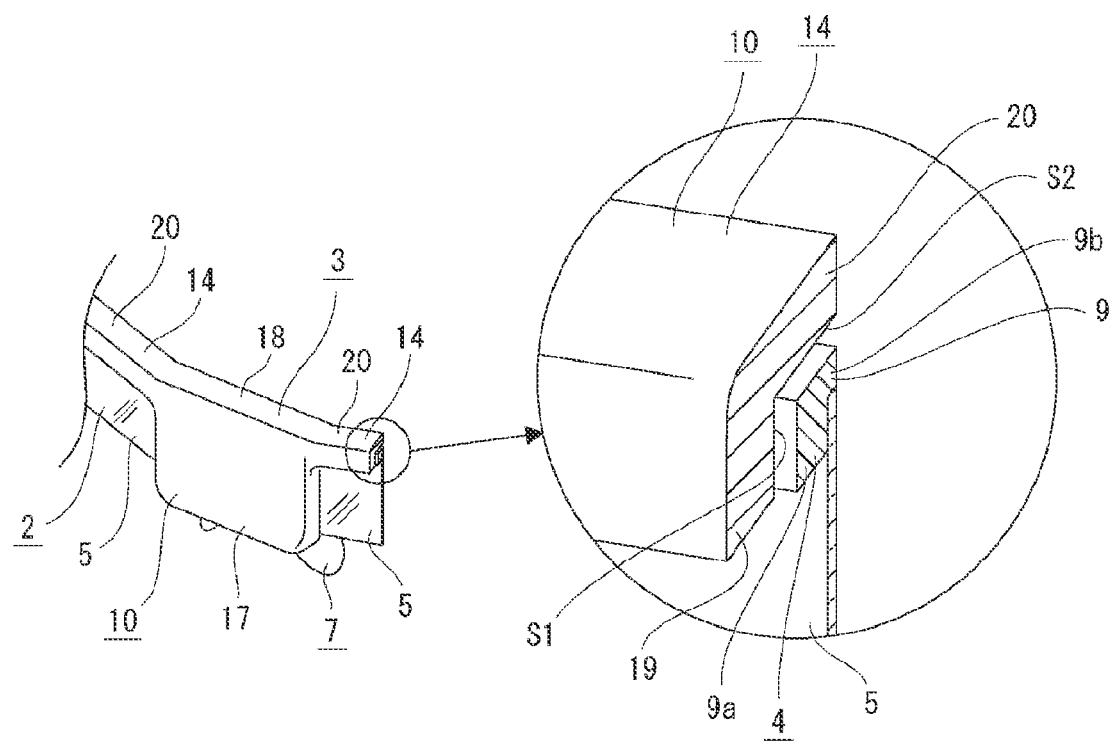
FIG. 4 is a perspective view of the head-mounted display illustrating a part thereof in cross section.

The extending parts 9 and 9 are formed in a shape extending in the horizontal direction, and include tabular walls 9a and 9a facing in the front-back direction, and overhangs 9b and 9b overhanging rearward from the upper ends of the walls 9a and 9a (see FIGS. 3 and 4). The overhangs 9b and 9b are formed in a tabular shape facing in the vertical direction.

Each of the optical plate 5 for the left eye and the optical plate 5 for the right eye is attached to and held by the first frame 4 (see FIG. 2). The optical plates 5 and 5 are formed in a tabular shape facing in the front-back direction, portions excluding a part of the upper ends are fixed to the walls 9a and 9a of the extending parts 9 and 9, respectively, by adhesion or the like, and one ends in the horizontal direction are fixed to the right and left ends of the fixing part 8, respectively, by adhesion or the like. The pair of optical plates 5 and 5 are arranged to form a predetermined convergence angle X in a state of being fixed to the extending parts 9 and 9 (see FIG. 3).

The optical plates 5 and 5 are positioned to be in front of the user's right eye or left eye when the head-mounted display 1 is worn, and are capable of emitting light to the user's right eye or left eye. The optical plates 5 and 5 are, for example, light guide plates capable of emitting light to the user's right eye or left eye, and includes, for example, glass. A polarization unit (not illustrated) is attached to the optical plates 5 and 5 so that the incident light is totally reflected inside the light guide plates. For example, a diffracting grating is used as the polarization unit.

The image generators 6 and 6 are attached to the rear surfaces of the ends of the optical plates 5 and 5 on the sides opposite to the fixing part 8 (see FIG. 2). With the image generators 6 and 6 being attached to the optical plates 5 and 5, the light for generating the image generated by the image generators 6 and 6 is reliably incident on the optical plates 5 and 5. Therefore, it becomes possible to secure a stable image display state on the head-mounted display 1.

The image generators 6 and 6 generate an image for the right eye or for the left eye, and project, as an optical image, the generated image on the right and left optical plates 5 and 5, respectively. The image generators 6 and 6 include, for example, an image generation unit and a collimator lens (not illustrated), and an outer casing for accommodating the image generation unit and the collimator lens. The image generation unit includes a light source and a liquid crystal display element, and emits light for generating an image. The collimator lens is configured to arrange the light emitted from the image generation unit into parallel light. An aperture is provided in the outer casing, and the parallel light emitted from the collimator lens passes through the aperture and enters the optical plates 5 and 5. The light incident on the optical plates 5 and 5 from the image generators 6 and 6 is guided while being totally reflected inside the optical plates 5 and 5, and is emitted toward the user's right eye or left eye.

The pad 7 is attached to the central part of the rear surface of the fixing part 8 in the horizontal direction. The pad 7 includes a tabular attachment part 7a to be attached to the fixing part 8, and a pair of nose pads 7b and 7b protruding from the lower end of the attachment part 7a and being further spaced apart from each other as they go downward. When the head-mounted display 1 is worn, the pair of nose pads 7b and 7b are positioned such that the user's nose is sandwiched therebetween from both the right and left sides.

The exterior unit 3 includes a second frame 10 fixed to the first frame 4, protective cases 11 and 11 attached to both ends of the second frame 10 in the horizontal direction, and temples 12 and 12 to be worn on the user's ears (see FIGS. 1 and 2).

The second frame 10 includes, for example, a resin material in a symmetrical shape. Note that both the first frame 4 and the second frame 10 may include a metal material or a resin material.

The second frame 10 includes a to-be-fixed part 13 positioned at the central part in the horizontal direction, a pair of protrusions 14 and 14 protruding from the upper end of the to-be-fixed part 13 toward the opposite sides in the horizontal direction, respectively, joining parts 15 and 15 protruding downward from the outer ends of the protrusions 14 and 14, respectively, and lower parts 16 and 16 protruding from the joining parts 15 and 15 toward the side of the to-be-fixed part 13, respectively. Note that the central part of the second frame 10 in the horizontal direction is not limited to the center in the horizontal direction, and may be a substantially central part near the center.

The to-be-fixed part 13 includes a tabular flat plate 17 facing in the front-back direction, and a posterior protrusion 18 protruding rearward from the upper end of the flat plate 17. On the rear surface of the flat plate 17, a plurality of, for example, two to-be-fastened parts 17a and 17a to be fastened to the fastening parts 8a and 8a are provided in a manner of being spaced apart from each other in the vertical direction. The to-be-fastened parts 17a and 17a are provided as protrusions protruding rearward, for example, and are inserted into the fastening parts 8a and 8a, respectively.

The protrusions 14 and 14 are formed in a shape extending in the horizontal direction, and include tabular walls 19 and 19 facing in the front-back direction, and overhangs 20 and 20 overhanging rearward from the upper ends of the walls 19 and 19. The ends of the overhangs 20 and 20 on the side of the to-be-fixed part 13 are continuous with the posterior protrusion 18, respectively. Posterior coverings 20a and 20a having widths that become narrower as they go rearward are provided at the ends of the overhangs 20 and 20 on the side opposite to the to-be-fixed part 13.

The joining parts 15 and 15 are formed in a tabular shape facing in the front-back direction.

The lower parts 16 and 16 are formed in a tabular shape facing in the vertical direction. The lower parts 16 and 16 are provided with posterior coverings 16a and 16a protruding rearward and having widths that become narrower as they go rearward. The posterior coverings 16a and 16a are formed in a shape similar to that of the posterior coverings 20a and 20a, and are positioned to face each other in the vertical direction.

The protective cases 11 and 11 are attached to both right and left ends of the second frame 10, and are provided as cover cases for covering the image generators 6 and 6. Each of the protective cases 11 and 11 includes an outer casing 11a opened in two directions of the side of the optical plate 5 and the side of the user, and a cover 11b that covers the opening on the side of the user. The opening edges of the outer casings 11a and 11a on the side of the optical plates 5 and 5 are coupled to the joining parts 15 and 15, the posterior coverings 16a and 16a, and the posterior coverings 20a and 20a. The image generators 6 and 6 are protected by the protective cases 11 and 11, whereby a proper operating state of the image generators 6 and 6 can be secured.

The temples 12 and 12 are attached to the outer casings 11a and 11a of the protective cases 11 and 11. The temples 12 and 12 extend rearward from the rear ends of the outer casings 11a and 11a, and portions on the rear end side are gently bent to form a shape easy to be worn on the user's ears.

In the head-mounted display 1 configured as described above, the to-be-fixed part 13 of the second frame 10 in the exterior unit 3 is fixed to the fixing part 8 of the first frame 4 in the image display unit 2.

The to-be-fixed part 13 is fixed to the fixing part 8 by adhesion, for example. In the state where the to-be-fixed part 13 is fixed to the fixing part 8, the flat plate 17 is in surface contact with the fixing part 8, and the to-be-fastened parts 17a and 17a are inserted into the fastening parts 8a and 8a, respectively. With the to-be-fastened parts 17a and 17a being inserted into the fastening parts 8a and 8a, the to-be-fastened parts 17a and 17a function as protrusions for positioning, and the fastening parts 8a and 8a function as holes for positioning, whereby the to-be-fixed part 13 can be positioned with respect to the fixing part 8. Furthermore, since the flat plate 17 is in surface contact with the fixing part 8, a stable and strong fixed state of the to-be-fixed part 13 with respect to the fixing part 8 can be secured.

Note that the exemplary case where the fastening parts 8a and 8a are formed as holes and the to-be-fastened parts 17a and 17a are formed as protrusions has been described above, the fastening parts 8a and 8a may be provided as protrusions and the to-be-fastened parts 17a and 17a may be provided as holes.

Furthermore, in the head-mounted display 1, the to-be-fastened parts 17a and 17a may be inserted into the fastening parts 8a and 8a to be fastened by, for example, press fitting, heat caulking, screws, or the like instead of adhesion. In this case, the second frame 10 can be easily assembled to the first frame 4 by a simple operation.

In the state where the to-be-fixed part 13 is fixed to the fixing part 8, the second frame 10 is positioned to entirely cover the first frame 4 from the front side and the upper side.

The protrusions 14 and 14 of the second frame 10 are arranged to cover the extending parts 9 and 9 and a part of the upper ends of the optical plates 5 and 5 from the front (see FIG. 4). At this time, a gap S1 is provided between the extending parts 9 and 9 and the walls 19 and 19, and a gap S2 is provided between the extending parts 9 and 9 and the overhangs 20 and 20, whereby the extending parts 9 and 9 are not in contact with the protrusions 14 and 14. In this manner, the extending parts 9 and 9 are covered by the walls 19 and 19 and the overhangs 20 and 20 so that the extending parts 9 and 9 are protected by the walls 19 and 19 and the overhangs 20 and 20, whereby deformation of the extending parts 9 and 9 can be suppressed.

The joining parts 15 and 15 of the second frame 10 are positioned in front of the ends of the optical plates 5 and 5 on the side opposite to the fixing part 8 in the horizontal direction, and the lower parts 16 and 16 are positioned under at least a part of the lower ends of the optical plates 5 and 5. The joining parts 15 and 15 and the lower parts 16 and 16 cover a part of the optical plates 5 and 5 from the front and from the bottom, respectively, thereby protecting the optical plates 5 and 5.

Figure 5:
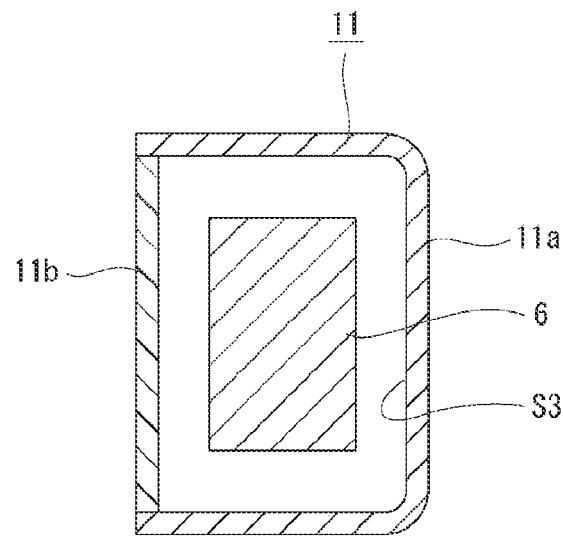
FIG. 5 is a cross-sectional view of an image generator and a protective case.

The protective cases 11 and 11 are arranged to cover the image generators 6 and 6, respectively, and a gap S3 is provided on the entire circumference between the protective cases 11 and 11 and the image generators 6 and 6 (see FIG. 5). Since the gap S3 is provided between the protective cases 11 and 11 and the image generators 6 and 6, an impact is less likely to be transmitted to the image generators 6 and 6 even in a case where an external pressure is applied to the protective cases 11 and 11. Therefore, a proper operating state of the image generators 6 and 6 can be secured.

<Summary>

In the head-mounted display 1, an external pressure may be applied to the exterior unit 3 at times when the temples 12 and 12 are attached to and detached from the ears, when they are touched while being worn on the ears, or the like. In a case where the first frame 4 is distorted by the external pressure, the convergence angle X (see FIG. 3) formed by the pair of optical plates 5 and 5 held by the first frame 4 changes, whereby the user may feel uncomfortable in visually recognizing the images displayed on the right and left optical plates 5 and 5, or the images may not be visually recognized properly.

However, as described above, the head-mounted display 1 includes the first frame 4 that holds the pair of optical plates 5 and 5, and the second frame 10 having the to-be-fixed part 13, and the fixing part 8 to which the to-be-fixed part 13 is fixed is provided at the central part of the first frame 4 in the horizontal direction. With this arrangement, the pair of optical plates 5 and 5 are held by the first frame 4 in a predetermined orientation, and the second frame 10 is fixed to the central part of the first frame 4 in the horizontal direction, whereby, even in a case where an external pressure is applied to the second frame 10, the first frames 4 and 4 are less likely to be distorted in the horizontal direction, a predetermined convergence angle X can be maintained, and the strength can be improved.

Furthermore, in the head-mounted display 1, the second frame 10 is fixed to the first frame 4 in such a state that the gap S1 and the gap S2 exist between the second frame 10 and the first frame 4 at portions other than the to-be-fixed part 13. With this arrangement, even in a case where an external pressure is applied to the second frame 10, the impact is less likely to be transmitted to the first frame 4, whereby the first frame 4 is less likely to be deformed. Therefore, a proper convergence angle X of the right and left optical plates 5 and 5 can be maintained, whereby a suitable image display state can be secured.

Moreover, in the head-mounted display 1, the to-be-fixed part 13 is positioned at the central part of the second frame 10 in the horizontal direction. With this arrangement, the second frame 10 is fixed to the fixing part 8 of the first frame 4 at the central part in the horizontal direction. Therefore, the weight of the second frame 10 is distributed substantially evenly in the horizontal direction, whereby a stable fixed state of the to-be-fixed part 13 with respect to the fixing part 8 and a stable wearing state of the head-mounted display 1 on the user can be secured.

Furthermore, in the head-mounted display 1, the second frame 10 entirely covers the first frame 4. With this arrangement, the entire first frame 4 is protected, and deformation of the first frame 4 can be suppressed.

In the head-mounted display 1, the first frame 4 is formed in a symmetrical shape. With this arrangement, the weight balance of the first frame 4 in the horizontal direction is made uniform. Therefore, a stable holding state of the pair of optical plates 5 and 5 with respect to the first frame 4 can be secured.

Furthermore, in the head-mounted display 1, the pair of extending parts 9 and 9 for holding the pair of optical plates 5 and 5 are provided on the first frame 4, and the pair of extending parts 9 and 9 protrude from at least one end of the fixing part 8 in the vertical direction toward the opposite side in the horizontal direction. With this arrangement, the optical plates 5 and 5 are held on both sides of the fixing part 8 in the horizontal direction. Therefore, the pair of optical plates 5 and 5 can be held in a stable state. Furthermore, with the extending parts 9 and 9 protruding in the horizontal direction at an optional angle, the convergence angle X of the pair of optical plates 5 and 5 can be easily set to an optional angle.

Furthermore, in the head-mounted display 1, the second frame 10 is formed in a symmetrical shape. With this arrangement, the weight balance of the second frame 10 in the horizontal direction is made uniform. Therefore, a stable fixed state of the second frame 10 with respect to the first frame 4 can be secured.

Furthermore, in the head-mounted display 1, the first frame 4 and the second frame 10 include different materials. With this arrangement, the first frame 4 and the second frame 10 include materials suitable for the respective functions, whereby the functionality of the first frame 4 and the second frame 10 can be improved.

Moreover, in the head-mounted display 1, the first frame 4 includes a material having rigidity higher than rigidity of a material included in the second frame 10. Therefore, the optical plates 5 and 5 are held by the first frame 4 including a material having rigidity higher than rigidity of a material included in the second frame 10, whereby the predetermined convergence angle X can be maintained highly accurately.

In particular, in the head-mounted display 1, the first frame 4 includes a metal material, and the second frame 10 includes a resin material. With this arrangement, the first frame 4 includes a metal material that can be subject to high-precision machining, and the second frame 10 includes a resin material that has appropriate strength and can be easily shaped. Therefore, the weight of the first frame 4 can be reduced as the second frame 10 functions as an exterior frame and a reinforcing member, and the second frame 10 is not required to be subject to high-precision machining as the first frame 4 guarantees predetermined convergence, whereby the manufacturing cost can be reduced.

In the head-mounted display 1, the pair of temples 12 and 12 to be respectively worn on both ears of the user are provided, and the pair of temples 12 and 12 are attached to the pair of protective cases 11 and 11, respectively. With this arrangement, the temples 12 and 12 are not attached to the first frame 4, and the first frame 4 is less likely to be distorted in the horizontal direction even in a case where the temples 12 and 12 extend in the horizontal direction when the head-mounted display 1 is worn on the ears. Therefore, the predetermined convergence angle X can be maintained.

Note that, although the exemplary case where the protective cases 11 and 11 are attached to both ends of the second frame 10 in the horizontal direction has been described above, the second frame 10 and at least a part of the protective cases 11 and 11 may be integrally formed. With this arrangement, the image generators 6 and 6 are protected by the protective cases 11 and 11 formed at least partially integrally with the second frame 10. Therefore, a proper operating state of the image generators 6 and 6 can be secured while the number of parts is reduced.

<Other Exemplary Configurations>

Figure 6:
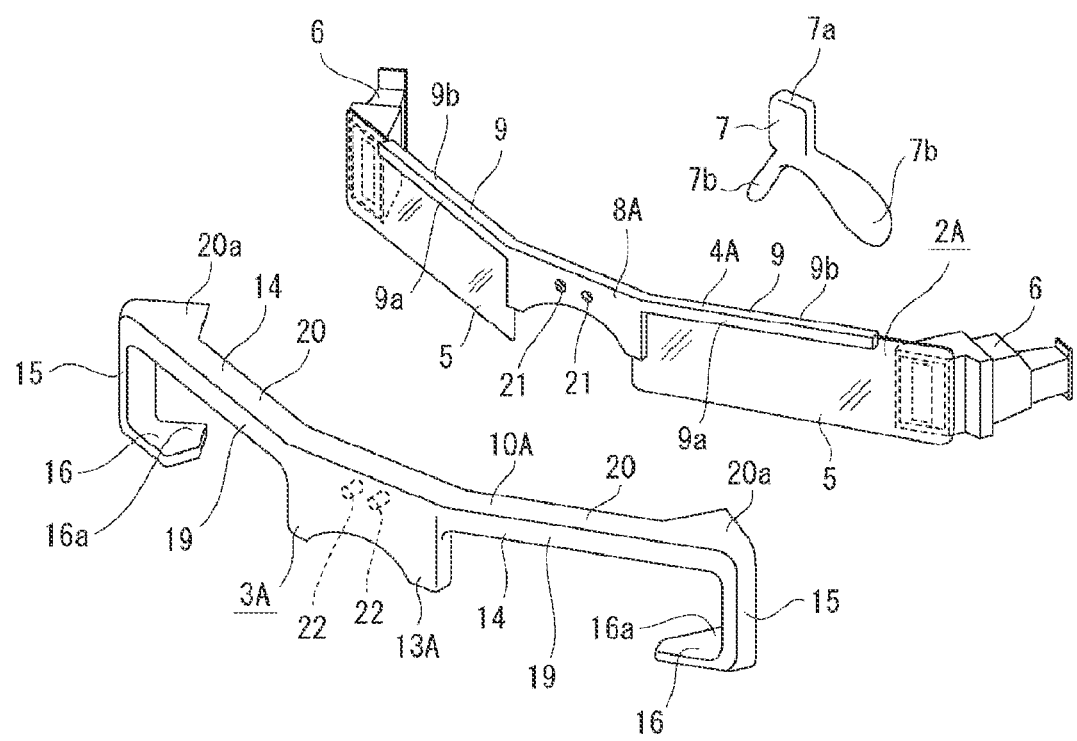
FIG. 6 is a perspective view illustrating another exemplary configuration of an image display unit and an exterior unit.

First, first another exemplary configuration will be described (see FIG. 6). The first another exemplary configuration includes an image display unit 2A and an exterior unit 3A.

In the image display unit 2A, a first frame 4A is used instead of the first frame 4. A fixing part 8A of the first frame 4A is formed in a tabular shape facing in the front-back direction. The fixing part 8A is provided with a plurality of, for example, two fastening parts 21 and 21 in a manner of being spaced apart from each other in the horizontal direction. The fastening parts 21 and 21 are formed as holes, for example. The fixing part 8A is formed to be approximately half the size of the fixing part 8 in the vertical direction. Since the fastening parts 21 and 21 are provided to be spaced apart from each other in the horizontal direction, it is possible to reduce the size of the fixing part 8A in the vertical direction. With this arrangement, the fixing part 8A is less likely to interfere with the user's nose, and the image display unit 2A can be made smaller and lighter.

In the exterior unit 3A, a second frame 10A is used instead of the second frame 10. A to-be-fixed part 13A of the second frame 10A is formed in a tabular shape facing in the front-back direction. The to-be-fixed part 13A is provided with a plurality of, for example, two to-be-fastened parts 22 and 22 in a manner of being spaced apart from each other in the horizontal direction. The to-be-fastened parts 22 and 22 are provided as, for example, protrusions protruding rearward. Since the to-be-fastened parts 22 and 22 are provided to be spaced apart from each other in the horizontal direction, it is possible to reduce the size of the to-be-fixed part 13A in the vertical direction. With this arrangement, the to-be-fixed part 13A is less likely to interfere with the user's nose, and the exterior unit 3A can be made smaller and lighter.

The to-be-fixed part 13A is fixed to the fixing part 8A in such a manner that the to-be-fastened parts 22 and 22 are inserted into the fastening parts 21 and 21, respectively, to be fastened to each other by, for example, press fitting, heat caulking, screws, or the like instead of adhesion. With the to-be-fixed part 13A fastened to the fixing part 8A at a plurality of points in the horizontal direction, the optical plates 5 and 5 can be held in a stable state.

Note that the to-be-fixed part 13A may be adhered to the fixing part 8A in addition to fastening the fastening parts 21 and 21 and the to-be-fastened parts 22 and 22. With this arrangement, the fixing strength of the to-be-fixed part 13A with respect to the fixing part 8A can be improved.

Furthermore, although the exemplary case where the fastening parts 21 and 21 are formed as holes and the to-be-fastened parts 22 and 22 are provided as protrusions protruding rearward has been described above, the fastening parts 21 and 21 may be provided as protrusions protruding forward, and the to-be-fastened parts 22 and 22 may be formed as holes into which the protrusions are inserted.

Figure 7:
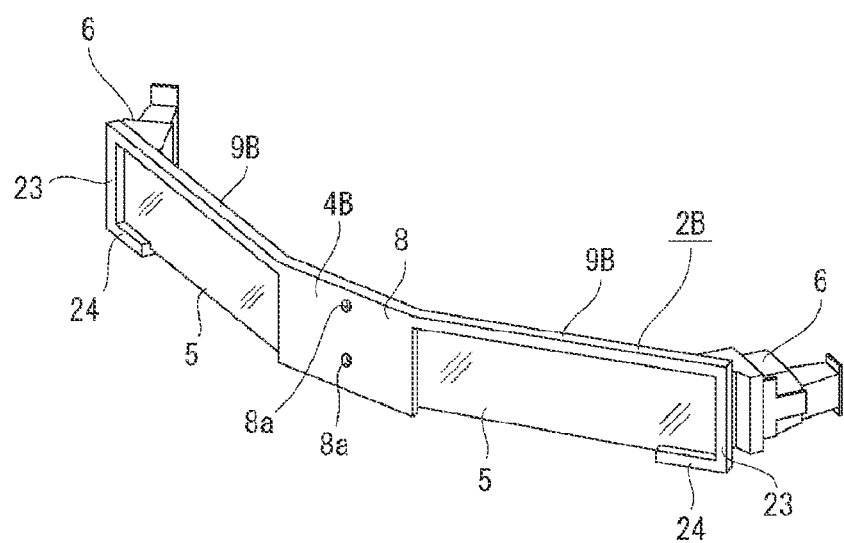
FIG. 7 is a perspective view illustrating still another exemplary configuration of the image display unit.

Next, second another exemplary configuration will be described (see FIG. 7). In the second another exemplary configuration, an image display unit 2B used in place of the image display unit 2 is provided in addition to the exterior unit 3, and the image display unit 2B includes a first frame 4B, optical plates 5 and 5, and image generators 6 and 6.

The first frame 4B includes a fixing part 8 positioned at the central part in the horizontal direction, a pair of extending parts 9B and 9B protruding from the upper end of the fixing part 8 toward the opposite sides in the horizontal direction, respectively, middle parts 23 and 23 protruding downward from the outer ends of the extending parts 9B and 9B, respectively, and lower end parts 24 and 24 protruding from the middle parts 23 and 23 toward the side of the fixing part 8, respectively. The middle parts 23 and 23 and the lower end parts 24 and 24 are formed in a tabular shape facing in the front-back direction, respectively. Note that the central part of the first frame 4B in the horizontal direction is not limited to the center in the horizontal direction, and may be a substantially central part near the center.

In the image display unit 2B, the image generators 6 and 6 are attached to the rear surfaces of the middle parts 23 and 23, respectively. With this arrangement, the image generators 6 and 6 are held by the first frame 4B together with the optical plates 5 and 5. Therefore, no dedicated member for holding the respective image generators 6 and 6 and the optical plates 5 and 5 is required, and the image generators 6 and 6 and the optical plates 5 and 5 can be held in a stable state while the number of parts is reduced.

<Others>

Figure 8:
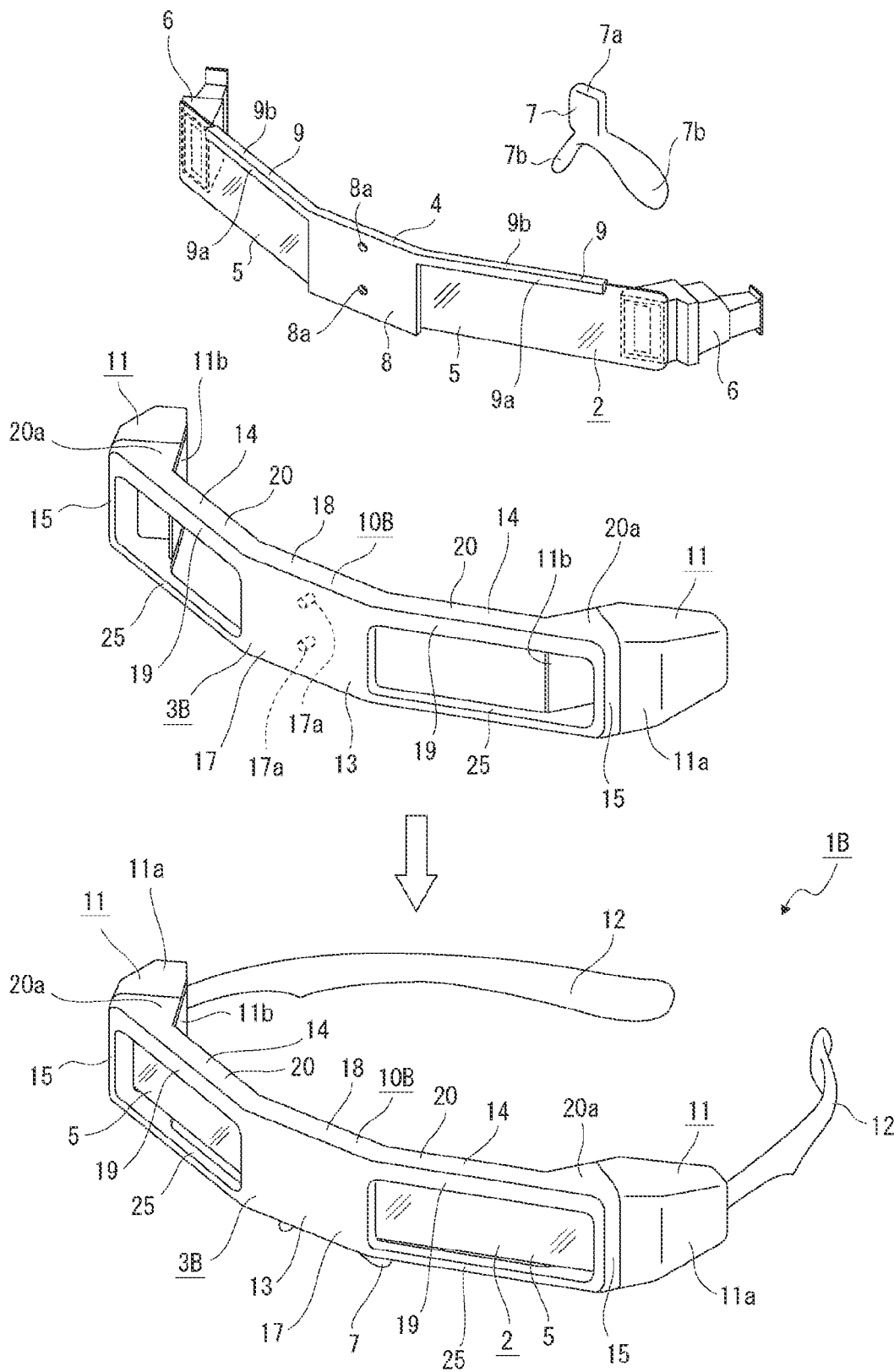
FIG. 8 is a perspective view illustrating another exemplary configuration of the head-mounted display.

For example, an exterior unit 3B can be attached to the image display unit 2 instead of the exterior unit 3 (see FIG. 8). The exterior unit 3B includes a second frame 10B instead of the second frame 10. The second frame 10B includes, instead of the lower parts 16 and 16, a pair of lower extending parts 25 and 25 protruding from the lower end of the to-be-fixed part 13 toward the opposite sides in the horizontal direction, respectively. The ends of the lower extending parts 25 and 25 on the side opposite to the to-be-fixed part 13 are continuous with the lower ends of the joining parts 15 and 15, respectively. With the exterior unit 3B being attached to the image display unit 2, a head-mounted display 1B is configured.

Similarly, it is possible to attach an exterior unit having another configuration to the image display unit 2A instead of the exterior unit 3A. Furthermore, it is also possible to attach an exterior unit having another configuration such as the exterior unit 3 and the exterior unit 3B to the image display unit 2B.

As described above, with the required parts being assembled in advance and unitized as an image display unit or an exterior unit, a head-mounted display having a different configuration can be easily manufactured in a short period of time by assembling an optional image display unit and an optional exterior unit. In addition, exterior units having different configurations can be assembled to image display units having the same configuration, and exterior units having the same configuration can be assembled to image display units having different configurations, whereby general versatility can be increased in head-mounted displays having different configurations on the basis of standardization of the parts of the image display unit or the exterior unit.

<Present Technology>

Note that the present technology can also employ the following configurations.

(1)

A head-mounted display including:

at least one image generator that generates an image;

a pair of optical plates to be arranged in front of both eyes of an observer who observes the image;

a first frame that holds the pair of optical plates; and a second frame including a to-be-fixed part, in which a fixing part to which the to-be-fixed part is fixed is provided at the central part of the first frame in the horizontal direction.

(2)

The head-mounted display according to (1) described above, in which the second frame is fixed to the first frame in a state of having a gap between the second frame and the first frame at a portion other than the to-be-fixed part.

(3)

The head-mounted display according to (1) or (2) described above, in which the to-be-fixed part is positioned at the central part of the second frame in the horizontal direction.

(4)

The head-mounted display according to any one of (1) to (3) described above, in which the first frame is formed in a symmetrical shape.

(5)

The head-mounted display according to any one of (1) to (4) described above, in which the second frame is formed in a symmetrical shape.

(6)

The head-mounted display according to any one of (1) to (5) described above, in which the at least one image generator includes two image generators, and protective cases are attached to both ends of the second frame in the horizontal direction to cover the two image generators, respectively.

(7)

The head-mounted display according to any one of (1) to (5) described above, in which the at least one image generator includes two image generators, two protective cases are provided to cover the two image generators, respectively, and the second frame and at least a part of the protective cases are integrally formed.

(8) The head-mounted display according to (6) or (7) described above, in which a gap is provided between the protective cases and the image generators.

(9) The head-mounted display according to any one of (1) to (8) described above, in which the second frame covers the entire first frame.

(10) The head-mounted display according to any one of (1) to (9) described above, in which the first frame is provided with a pair of extending parts that hold the pair of optical plates, and the pair of extending parts protrude from at least one end of the fixing part in the vertical direction toward the opposite side in the horizontal direction.

(11) The head-mounted display according to (10) described above, in which the second frame is provided with a pair of protrusions protruding from at least one end of the to-be-fixed part in the vertical direction toward the opposite side in the horizontal direction, each of the protrusions includes a tabular wall facing in the front-back direction, and an overhang overhanging rearward from one end of the wall in the vertical direction, and the wall and the overhang cover the extending part.

(12) The head-mounted display according to any one of (1) to (11), in which the to-be-fixed part includes a tabular flat plate facing in the front-back direction, and a posterior protrusion protruding rearward from at least one end of the flat plate in the vertical direction, and the to-be-fixed part is fixed in a state where the flat plate is in surface contact with the fixing part.

(13) The head-mounted display according to any one of (1) to (12) described above, in which a plurality of fastening parts is provided in a state of being spaced apart from each other in the vertical direction at the central part of the fixing part in the horizontal direction, and the to-be-fixed part is provided with to-be-fastened parts to be fastened to the plurality of fastening parts, respectively.

(14) The head-mounted display according to any one of (1) to (12) described above, in which the fixing part is provided with a plurality of fastening parts in a state of being spaced apart from each other in the horizontal direction, and the to-be-fixed part is provided with to-be-fastened parts to be fastened to the plurality of fastening parts, respectively.

(15) The head-mounted display according to any one of (1) to (14) described above, in which the at least one image generator is attached to the optical plates.

(16) The head-mounted display according to any one of (1) to (14) described above, in which the at least one image generator is attached to the first frame.

(17) The head-mounted display according to any one of (1) to (16) described above, in which the first frame and the second frame include different materials.

(18) The head-mounted display according to (17) described above, in which the first frame includes a material having rigidity higher than rigidity of a material included in the second frame.

(19) The head-mounted display according to (18) described above, in which the first frame includes a metal material, and the second frame includes a resin material.

(20) The head-mounted display according to any one of (6) to (8) described above, in which a pair of temples to be worn on both ears of the observer are provided, and the pair of temples are attached to a pair of the protective cases, respectively.

REFERENCE SIGNS LIST 1, 1B Head-mounted display
2, 2A, 2B Image display unit
3, 3A, 3B Exterior unit
4, 4A, 4B First frame
5 Optical plate
6 Image generator
8 Fixing part
8a Fastening part
10, 10A, 10B Second frame
11 Protective case
12 Temple
13 To-be-fixed part
17 Flat plate
17a To-be-fastened part
18 Posterior protrusion
21 Fastening part
22 To-be-fastened part

The invention claimed is:

1. A head-mounted display, comprising:
at least one image generator configured to generate an image;
a pair of optical plates in front of both eyes of an observer, wherein the observer observes the image;
a first frame configured to hold the pair of optical plates;
a second frame that includes a to-be-fixed part, wherein
a material of the first frame is different from a material of the second frame, and
a rigidity of the material of the first frame is higher than a rigidity of the material of the second frame; and
a fixing part to which the to-be-fixed part is fixable, wherein the fixing part is at a central part of the first frame in a horizontal direction.

2. The head-mounted display according to claim 1, wherein
the second frame is fixable to the first frame in a state of a gap between the second frame and the first frame at a portion other than the to-be-fixed part.

3. The head-mounted display according to claim 1, wherein the to-be-fixed part is at a central part of the second frame in the horizontal direction.

4. The head-mounted display according to claim 1, wherein the first frame is in a symmetrical shape.

5. The head-mounted display according to claim 1, wherein the second frame is in a symmetrical shape.

6. The head-mounted display according to claim 1, further comprising protective cases, wherein
the at least one image generator includes two image generators, and
the protective cases are attachable to both ends of the second frame in the horizontal direction to cover the two image generators, respectively.

7. The head-mounted display according to claim 6, wherein a gap is present between the protective cases and the two image generators.

8. The head-mounted display according to claim 6, further comprising a pair of temples wearable on both ears of the observer, wherein the pair of temples are attachable to a pair of the protective cases, respectively.

9. The head-mounted display according to claim 1, further comprising two protective cases wherein
the at least one image generator includes two image generators,
the two protective cases cover the two image generators, respectively, and
the second frame is integrated with at least a part of the two protective cases.

10. The head-mounted display according to claim 1, wherein the second frame covers the first frame.

11. The head-mounted display according to claim 1, wherein
the first frame includes a pair of extending parts that hold the pair of optical plates, and
the pair of extending parts protrude from at least one end of the fixing part in a vertical direction toward an opposite side in the horizontal direction.

12. The head-mounted display according to claim 11, wherein
the second frame includes a pair of protrusions protruding from at least one end of the to-be-fixed part in the vertical direction toward the opposite side in the horizontal direction,
each protrusion of the pair of protrusions includes a tabular wall facing in a front-back direction, and an overhang overhanging rearward from one end of the tabular wall in the vertical direction, and
the tabular wall and the overhang cover a respective extending part of the pair of extending parts.

13. The head-mounted display according to claim 1, wherein
the to-be-fixed part includes:
a tabular flat plate facing in a front-back direction, and
a posterior protrusion protruding rearward from at least one end of the tabular flat plate in a vertical direction, and
the to-be-fixed part is fixed in a state where the tabular flat plate is in surface contact with the fixing part.

14. The head-mounted display according to claim 1, wherein
the fixing part includes a plurality of fastening parts is in a state of being spaced apart from each other in a vertical direction at a central part of the fixing part in the horizontal direction, and
the to-be-fixed part is with to-be-fastened parts fastened to the plurality of fastening parts, respectively.

15. The head-mounted display according to claim 1, wherein
the fixing part includes a plurality of fastening parts in a state of being spaced apart from each other in the horizontal direction, and
the to-be-fixed part includes to-be-fastened parts to be fastened to the plurality of fastening parts, respectively.

16. The head-mounted display according to claim 1, wherein the at least one image generator is attachable to the pair of optical plates.

17. The head-mounted display according to claim 1, wherein the at least one image generator is attachable to the first frame.

18. The head-mounted display according to claim 1, wherein
the first frame includes a metal material, and
the second frame includes a resin material.

19. A head-mounted display, comprising:
at least one image generator configured to generate an image;
a pair of optical plates in front of both eyes of an observer, wherein the observer observes the image;
a first frame configured to hold the pair of optical plates; and
a second frame that includes a to-be-fixed part, wherein
a material of the first frame is different from a material of the second frame, and
the first frame includes a fixing part to which the to-be-fixed part is fixable,
the fixing part is at a central part of the first frame in a horizontal direction,
the fixing part includes a plurality of fastening parts in a state of being spaced apart from one another in the horizontal direction, and
the to-be-fixed part includes to-be-fastened parts to be fastened to the plurality of fastening parts, respectively.

* * * * *